United States Patent

Cairo

Patent Number: 5,961,287
Date of Patent: Oct. 5, 1999

[54] TWIN-WEB ROTOR DISK

[75] Inventor: Ronald R. Cairo, Palm City, Fla.

[73] Assignee: United Technologies Corporation, Hartford, Conn.

[21] Appl. No.: 08/936,404

[22] Filed: Sep. 25, 1997

[51] Int. Cl.⁶ ................................................. F01D 5/18
[52] U.S. Cl. .............................. 416/97 R; 416/244 A; 416/214 A; 416/208
[58] Field of Search .................... 415/115; 416/95, 416/96 R, 96 A, 97 R, 213 R, 208, 214 A, 244 A

[56] References Cited

U.S. PATENT DOCUMENTS

| | | |
|---|---|---|
| 752,340 | 2/1904 | Holzwarth . |
| 2,354,101 | 7/1944 | Broders ................................... 170/173 |
| 3,014,691 | 12/1961 | Stalker ..................................... 253/39 |
| 3,053,437 | 9/1962 | Ambrose ............................. 416/244 A |
| 3,742,706 | 7/1973 | Klompas ................................ 60/39.66 |
| 3,799,698 | 3/1974 | Haworth .................................. 416/204 |
| 3,970,412 | 7/1976 | Sundt .................................. 416/219 R |
| 3,982,852 | 9/1976 | Andersen et al. ......................... 416/95 |
| 4,051,585 | 10/1977 | Walker et al. ...................... 29/156.8 R |
| 4,102,603 | 7/1978 | Smith et al. ......................... 416/244 A |
| 5,161,950 | 11/1992 | Krueger et al. ..................... 416/204 R |
| 5,197,857 | 3/1993 | Glynn et al. ........................ 416/204 A |
| 5,213,475 | 5/1993 | Peterson et al. .................... 416/219 R |
| 5,486,095 | 1/1996 | Rhoda et al. ........................ 416/214 A |
| 5,624,233 | 4/1997 | King et al. .......................... 416/219 R |

*Primary Examiner*—Edward K. Look
*Assistant Examiner*—Richard Woo
*Attorney, Agent, or Firm*—Richard D. Getz

[57] ABSTRACT

A rotor disk for a gas turbine engine having an axis of rotation and an axial centerline is provided which includes a rim, forward and aft hubs, and forward and aft webs. The forward web extends between the rim and the forward hub, and the aft web extends between the rim and the aft hub. The forward and aft hubs are separated. Each web is skewed from the axial centerline. A circumferentially extending cavity is formed between the webs and the hubs.

11 Claims, 2 Drawing Sheets

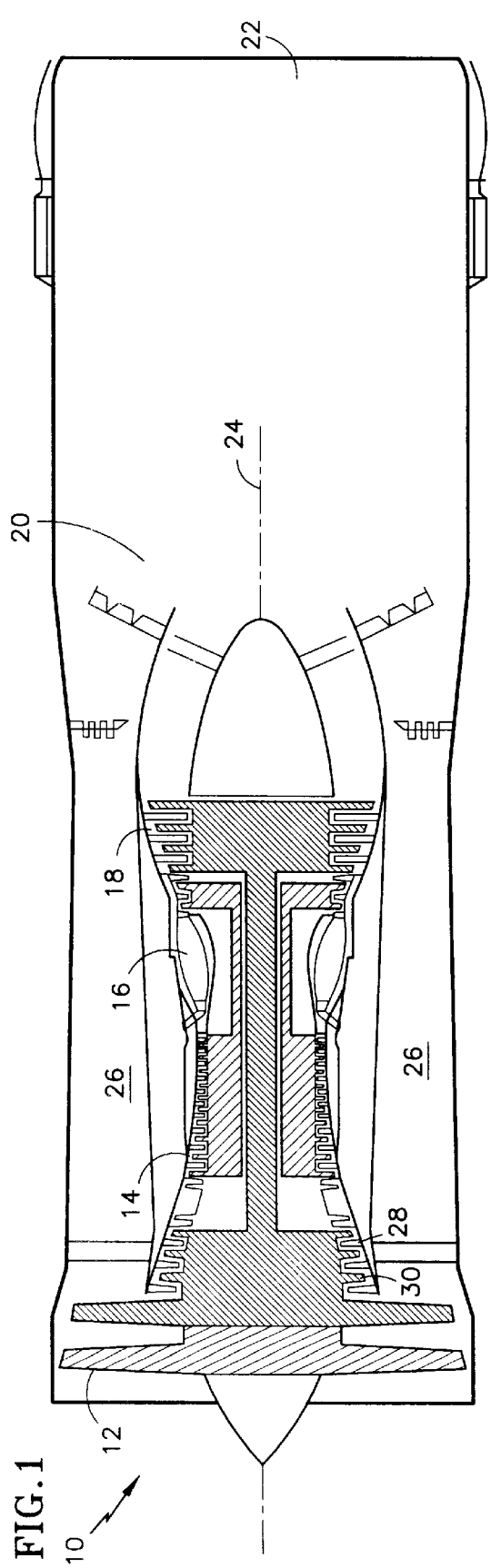
FIG.1
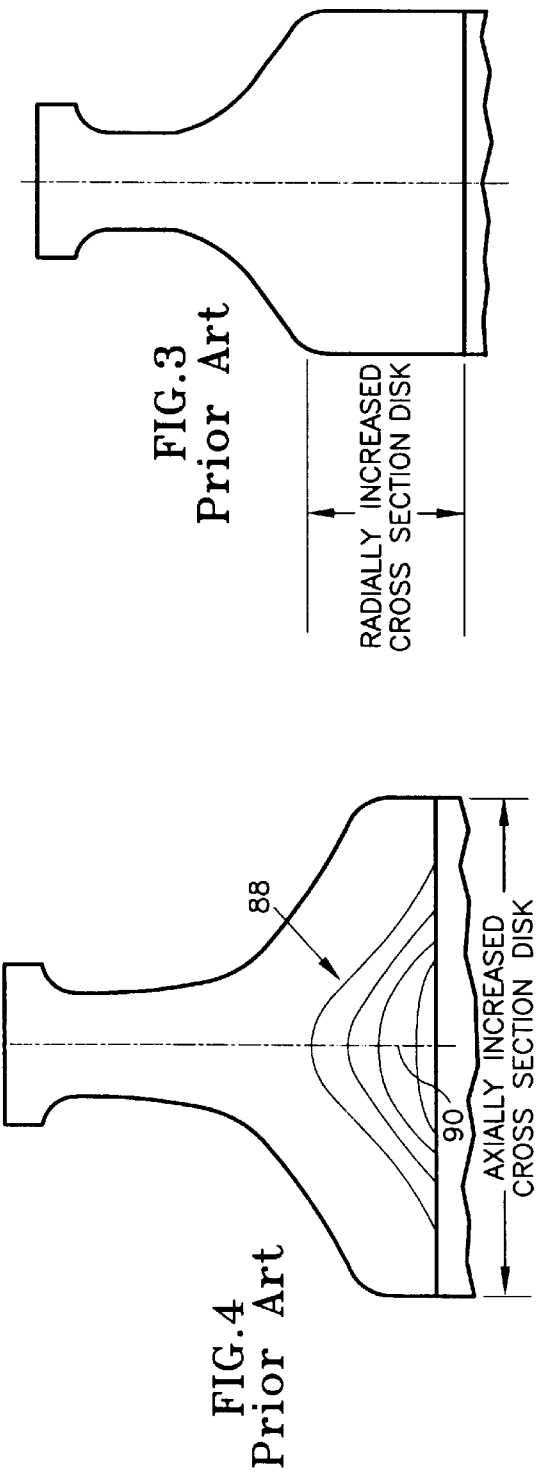
FIG.3
Prior Art
FIG.4
Prior Art

TWIN-WEB ROTOR DISK

The invention was made under a U.S. Government contract and the Government has rights herein.

BACKGROUND OF THE INVENTION

1. Technical Field

The present invention relates to rotors used within gas turbine engines in general, and to gas turbine rotors having a hollow disk in particular.

2. Background Information

Alternating stator and rotor stages form the fan, compressor, and turbine in most modern gas turbine engines. The stator stages increase the efficiency of the engine by guiding core gas flow into or out of the rotor stages. The rotor stages in the fan and compressor add work to the core gas flow to produce thrust. The rotor stages in the turbine, in contrast, extract a portion of that work to power the fan and compressor. Each rotor stage includes a disk and a plurality of rotor blades mechanically attached (e.g., by "fir tree" or "dovetail" attachment) or integrally bonded (i.e., an "integrally bladed rotor", or "IBR") to the rim of the disk. The rim of the disk is attached to a center hub via a web extending therebetween.

During operation, each rotor disk is mechanically and thermally loaded. Thermal loading (and consequent stress) is usually greatest during a transient period when the disk is exposed to a significant thermal change in a short period of time. Conventional solid rotor disks having a massive hub are particularly susceptible to thermally induced stress. The exterior regions of the massive hub will cool off or heat up relatively quickly in response to the thermal change. The interior regions cannot react as quickly, however, thereby causing a disparity in thermal growth within the hub that results in thermally induced stress. Mechanical loading, the other principal stress inducing component, emanates from core gas acting on the rotor blades and centrifugal force acting on each rotor stage component. The centrifugal force may be simplistically described by the following equation:

$$F = m\frac{v^2}{r} = \omega^2 r$$

where: F=centrifugal force acting on a body; m=the mass of the body; v=the tangential velocity of the body at a particular radial distance; r=the radial distance between the body and the axis of rotation; and ω=the angular speed of the body. As can be seen from the above equation, centrifugal force is directly related to the radial distance of the body and the square of the angular speed of the body. Mass of each rotor stage component and its radial position is, therefore, of paramount importance in high speed applications (i.e., those above 20,000 rpm).

Under ideal conditions, the mechanical load is uniformly distributed over the length of the hub bore so that load induced circumferential stress (also called "hoop stress") is likewise uniformly distributed and consequently minimized. Conventional solid rotor disks, however, tend to localize the mechanical load within the center region of the hub (i.e., in the region substantially radially aligned with the web and rotor blades). The hub bore of the conventional solid disk, which ultimately bears the entire mechanical load, consequently experiences a concentration of hoop stress within the center region. A person of skill in the art will recognize that non-uniform load distribution and consequent hoop stress undesirably limits component life.

Higher rotor disk loads have historically been accommodated by increasing the cross-sectional area of the disk; i.e., making the disk more robust. In theory, a greater cross-sectional area promotes distribution of the load within the disk, which in turn minimizes the stress at any particular point. As one might expect from the above explanation of centrifugal force, however, this approach has limits. Increasing the disk cross-sectional area predominantly in the radial direction (see FIG. 3) provides limited returns because of the additional centrifugal load it creates. Increasing the disk cross-sectional area predominantly in the axial direction (see FIG. 4), on the other hand, also provides limited returns because the above described non-uniform loading within the hub.

Adding mass to the disk can also make it difficult to manufacture a disk with uniform mechanical properties. Rotor disks, particularly those used in high speed applications are often forged because forging provides a higher tolerance to hoop stress than a similar cast rotor. After machining, the forged disk is typically heated and rapidly quenched to increase the disk's hoop stress capacity. In some instances, however, the thermal inertia inherent in a massive disk hub prevents the hub's interior region from being quenched at the same rate as its exterior regions. The disparity in quench rates creates a grain structure profile (and consequent material strength profile) exactly inverse to what is needed within a conventional solid disk where the localized load extends through the center region of the hub.

The need to provide cooling air to the rotor blades is another design consideration. Turbine rotor blades, for example, include internal cooling air passages for heat transfer purposes. Providing the cooling air to the rotating blades has historically been a challenge. U.S. Pat. No. 3,742,706 ('706), issued to the General Electric Company, discloses that a rotor disk may comprise two axially spaced disks interconnected by a plurality of circumferentially spaced vanes, which extend radially outward. The vanes and the passages therebetween are claimed to centrifuge and pump cooling air radially outward toward the rotor blades. U.S. Pat. No. 3,982,852 ('852), also issued to the General Electric Company, discloses that interconnecting vanes, similar to those disclosed in '706, can be stressed compressively far in excess of the material capability. A problem with creating passages between disk halves via a plurality of vanes is, therefore, the effect the passages have on the load capacity (and therefore the rotational speed) of the disk. As stated earlier, the loading on conventional disks is axially centered within the disk. Passages aligned with the load path may compromise the load capacity of such a disk.

Another problem with a rotor disk having a plurality of passages between disk halves is the difficulty and cost of manufacturing such a disk. A forged bond between metallic elements can be accomplished in a relatively short period of time, provided the elements to be joined are adequately heated and a high pressure is available to force the elements together. An advantage of a forged bond is that the time at temperature is usually not great enough to cause significant degradation of mechanical properties. A disadvantage of a forged bond, particularly when one of the bond surfaces is a narrow vane, is that one or more vanes could buckle during the bonding process. If none of the vanes buckle, there is still a likelihood that a significant amount of material upset will be produced adjacent the bond interface. A person of skill in the art will recognize that removing upset from radial passages within a rotor disk is difficult at best. Upset left in the passage will impede flow and create undesirable stress risers. A diffusion bond between metallic elements, in contrast, requires a relatively long period of time and adequate heat to create an acceptable bond, but does not require high pressure to force the elements together. An advantage of diffusion bonding is that little or no upset is formed adjacent the bond interface. A disadvantage of using diffusion bonding to join the rotor disk halves is the required time at temperature is usually sufficient to cause significant degradation of mechanical properties.

Hence, what is needed is a rotor disk for a gas turbine engine having a high load capacity, one capable of performing in a high speed application, one that can be successfully heat treated, one that can be readily manufactured, and one capable of providing cooling air to rotor blades attached thereto.

DISCLOSURE OF THE INVENTION

It is, therefore, an object of the present invention to provide a high load capacity rotor disk for a gas turbine engine.

It is another object of the present invention to provide a rotor disk having a higher rotational speed capacity than conventional gas turbine engine solid rotor disks.

It is another object of the present invention to provide a gas turbine engine rotor disk that can be effectively heat treated.

It is another object of the present invention to provide a gas turbine engine rotor disk that can be readily manufactured.

It is another object of the present invention to provide a gas turbine engine rotor disk with means for providing cooling air to a rotor blade attached to its rim.

According to the present invention, a rotor disk for a gas turbine engine having an axis of rotation and an axial centerline is provided which includes a rim, forward and aft hubs, and forward and aft webs. The forward web extends between the rim and the forward hub, and the aft web extends between the rim and the aft hub. The forward and aft hubs are separated. Each web is skewed from the axial centerline. A circumferentially extending cavity is formed between the webs and the hubs.

According to one aspect of the present invention, means for propelling cooling air into attached rotor blades is provided.

An advantage of the present invention is that the twin webs and hubs give the rotor disk a higher load capacity than that of comparable conventional gas turbine engine rotor disks. Specifically, the skewed twin webs, each of which is substantially centered on one of the twin hubs, provide an efficient load path between the rim and the hubs that uniformly distributes the load within each hub. The uniform load distribution prevents concentrations of hoop stress which can limit the load capacity of the rotor disk. In addition, the skewed twin webs and twin hubs also minimize axial stress adjacent the hub bore. Conventional wide-hub, high-speed, single web disks with a high load localized at in the central region of the hub experience a significant bending moment component in the axial direction which induces a three dimensional stress state in the hub adjacent the bore. The present invention's twin webs substantially centered on the relatively narrow twin hubs cause the twin hubs to experience far less axial bending which, in turn, minimizes the axial stress adjacent the hub bore, thereby increasing component life.

A further advantage of the present invention is that the present invention hubs can be effectively heat treated, in contrast to the massive hub of a comparable conventional solid rotor disk. Heat treating optimizes the mechanical properties that increase the hoop strength, and therefore the load capacity, of the rotor disk. An important advantage that stems from the increased load capacity is the ability of the present invention rotor disk to sustain operation at higher than conventional rotational speeds.

Another advantage of the present invention is that it can be readily manufactured. Some prior art rotor disk designs employ cooling passages disposed along the axial centerline of the rotor disk. The passages are formed between adjacent vanes extending between sections of the hub, web, and rim of the disk. Joining the disk sections together by forged bond can lead to structural instability (vane buckling) and undesirable material upset within the passages. Joining the disk sections by diffusion bonding avoids substantial formations of upset within the passages, but can adversely effect the hoop strength of the disk sections. The present invention, in contrast, provides that two forged disk halves can be metallurgically bonded along the rim into a single unit with a robust rim. Starting out with two forged halves allows the interior surfaces of each web to be machined prior to assembly, when access is easy. Metallurgically bonding the two halves together also provides a robust rim, well suited for broaching procedures (mechanically attached rotor blades) or metallurgical bonding (IBR's).

Another advantage of the present invention is that a means for providing cooling air to a rotor blade attached to the disk rim can be readily incorporated into the rotor disk, without compromising the disks manufacturability or its load capacity.

These and other objects, features and advantages of the present invention will become apparent in light of the detailed description of the best mode embodiment thereof, as illustrated in the accompanying drawings.

DESCRIPTION OF THE DRAWINGS

FIG. 1 is a diagrammatic view of a gas turbine engine.

FIG. 3 is a diagrammatic view of a conventional solid rotor disk having a radially enhanced hub.

FIG. 4 is a diagrammatic view of a conventional solid rotor disk having an axially enhanced hub.

BEST MODE FOR CARRYING OUT THE INVENTION

Figure 2:
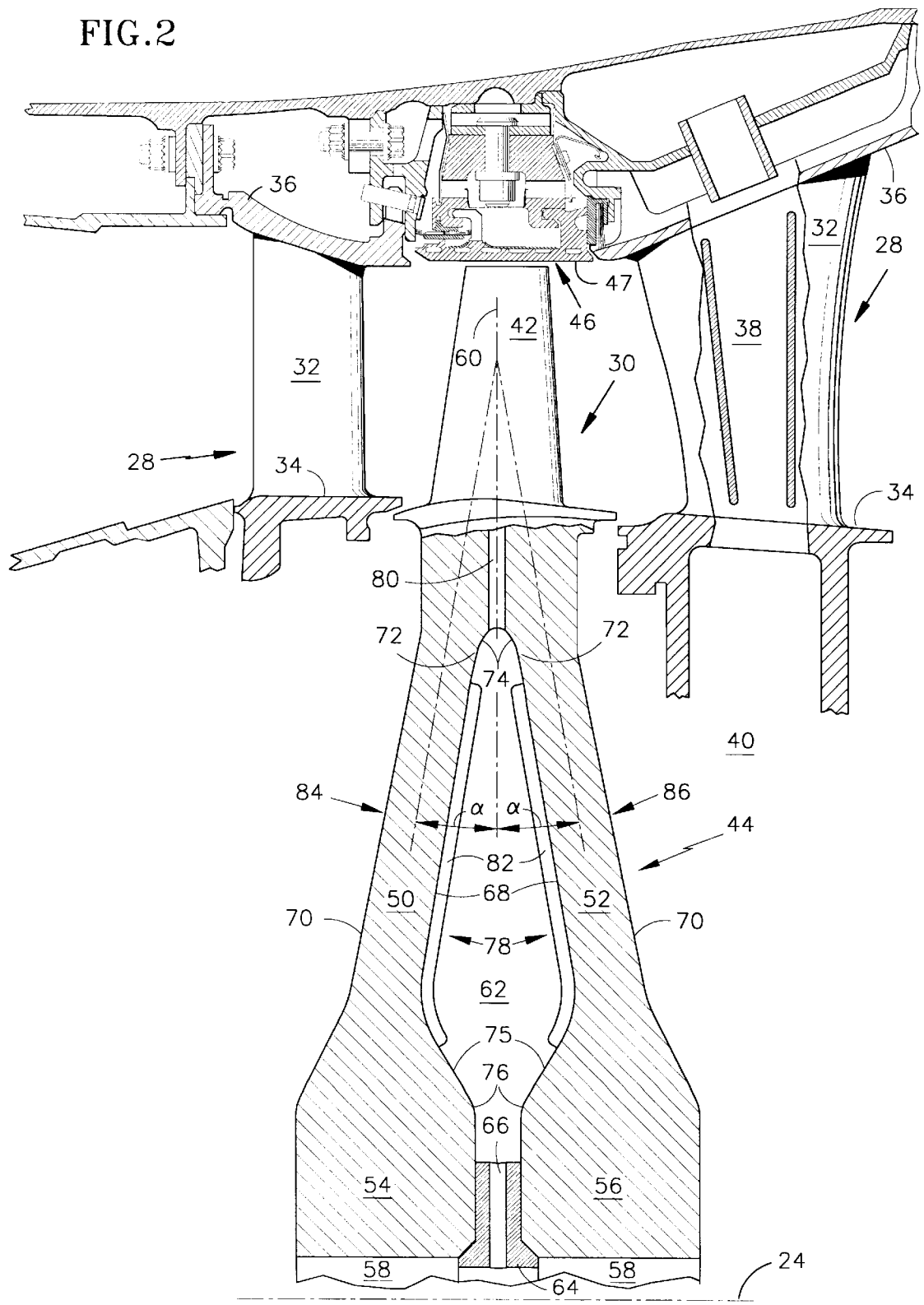
FIG. 2 is a diagrammatic partial view of a turbine rotor stage and stator stages.

Referring to FIG. 1, a gas turbine engine 10 may be described as having a fan 12, a compressor 14, a combustor 16, a turbine 18, an augmentor 20, and a nozzle 22. Air exiting the fan 12 is divided between core gas and bypass air. Core gas follows a path through the compressor 14, combustor 16, turbine 18, augmentor 20, and nozzle 22 in that order. Core gas may, therefore, be described as following a path substantially parallel to the axis 24 of the engine 10. Bypass air also follows a path parallel to the axis 24 of the engine 10, passing through an annulus 26 extending along the periphery of the engine 10. The fan 12, compressor 14, and turbine 18 each include a plurality of stator stages 28 and rotor stages 30. Now referring to FIG. 2, each stator stage 28 includes a plurality of stator vanes 32 extending between inner 34 and outer 36 radial platforms. The inner 34 and outer 36 radial platforms extend circumferentially to form core gas path boundaries. In some applications, stator vanes 32 include passages 38 through which bypass air may be directed into areas 40 radially inside the core gas flow path. Each rotor stage 30 includes a plurality of rotor blades 42 extending radially outward from a disk 44. The rotor blades 42 may be attached to the disk 44 via mechanical attachment methods (e.g., fir tree or dovetail root) or may be integrally attached as a part of an integrally bladed rotor (IBR). A liner 46, disposed radially outside of the rotor stage 30, may include blade outer air seals 47, or the like, for sealing at the tip of the rotor blades 42.

The rotor disk 44 includes a rim 48, forward 50 and aft 52 webs, and forward 54 and aft 56 hubs. The forward hub 54 is connected to the rim 48 by the forward web 50, and the aft hub 56 is connected to the rim 48 by the aft web 52. The hubs 54,56 are separated from one another, and each includes a bore 58 centered on the disk's axis of rotation 24 (referred to above as the axis of the engine). Each web 50,52 is substantially centered on its respective hub 54,56. In addition, the webs 50,52 and the hubs 54,56 are substantially symmetrically positioned relative to the axial centerline 60 of the disk 44, which extends perpendicularly out from the axis of rotation 24 in a radial direction. Each web 50,52 is skewed an amount from the axial centerline 60, hereinafter referred to as the "web skew angle" or "α". As can be seen in FIG. 2, the webs 50,52 skew away from the axial centerline 60, when traveling radially inward from the rim 48 to each hub 54,56. The skewed webs 50,52 and separated hubs 54,56 form a cavity 62 within the disk 44. In the preferred embodiment, a hub spacer 64 is positioned between the hubs 54,56 to maintain a desired separation distance under all loadings. The hub spacer 64 is preferably a segmented ring having passages 66 to allow air flow into the disk cavity 62.

Each web 50,52 includes an interior surface 68 and an exterior surface 70. At its outer radial end 72, each interior surface 68 includes a transition surface 74 that arcuately turns toward the other interior surface 68. Together, the two transition surfaces 74 provide a smooth transition between web interior surfaces 68. At its inner radial end 75, each interior surface 68 includes a transition surface 76 that, in traveling from the web to the hub, arcuately turns toward the other interior surface 68, thereby providing a smooth transition into the respective hub 54,56. In one embodiment, the interior surfaces 68 further include means 78 for propelling cooling air passed into the cavity 62, radially outward and into passages 80 within the rim 48 for rotor blade 42 cooling purposes. The means 78 for propelling cooling air may, for example, include a plurality of circumferentially distributed vanes 82 extending out a distance from each interior surface 68.

The rotor disk 44 is manufactured initially in two halves 84,86. The forward half 84 includes a portion of the rim 48, the forward web 50, and the forward hub 54 and the aft half 86 includes the other portion of the rim 48, the aft web 52, and the aft hub 56. For high load applications, such as a high speed turbine disk, each disk half 84,86 may be forged from a nickel alloy and machined to the approximate final shape. The interior surfaces 68 are subsequently finished, including machining the cooling vanes 82 into (and/or attaching the cooling vanes 82 to) the interior surfaces 68 of each disk half 84,86 as appropriate. The rim 48 portions of each half 84,86 are machined to accept the metallurgical bonding step where the two halves 84,86 are joined to form the disk 44. The preferred bonding method involves a forged type bond which utilizes localized heating and an intermediary diffusable foil (not shown). The relatively short time required for the forged bond and the localized heating minimize the effect of the bonding process on the metallurgical characteristics of each forged half 84,86 and the upset formed in the process. After the disk halves 84,86 are joined, the final exterior machining is completed and the disk 44 is heat treated as necessary. The heat treating process of the present invention is greatly simplified by virtue of the twin webs 50,52 and hubs 54,56. As stated earlier, conventional massive solid disks (see FIGS. 3 and 4) are difficult to thoroughly heat treat without compromising the hoop strength of the disk. The less massive twin webs 50,52 and hubs 54,56 of the present invention disk can be heat treated effectively to establish optimum metallurgical properties with minimal or no undesirable consequences.

In the operation of a rotor stage, a rotor disk is subject to considerable stress that can decrease the usable life of the disk. Stress resulting from a thermal load, is greatest during transient periods when the disk expands or contracts due to a significant thermal change. The twin hubs 54,56 of the present invention, each less massive than a conventional hub (see FIGS. 3 and 4), provide minimal thermal lag and consequent thermal stress. Stress resulting from a mechanical load, on the other hand, increases with rotational speed. FIG. 4 shows a diagrammatic representation of hoop stress 88 concentrated within an axial center region 90 caused by a non-uniform, axial centered mechanical loading (as described above). The present invention rotor disk 44 minimizes mechanically induced stress by symmetrically distributing the centrifugal load to the twin webs 50,52 and hubs 54,56. The arcuate transition surface 74 at the outer radial end 72 of each web interior surface 68 facilitates the load transition into the webs 50,52, thereby minimizing stress concentration at the intersection of the webs 50,52. The webs 50,52, in turn, centrally intersect, and axially expand into, the hubs 54,56. The smooth transition between the webs 50,52 and hubs 54,56, and the minimal axial expansion necessary from web 50,52 to hub 54,56, promotes uniform load distribution and minimizes hoop stress concentration within each hub bore 58. In addition, the twin hubs 54,56 can be readily heat treated throughout to provide optimum hoop strength, with little or none of the adverse consequences likely when heat treating a massive solid rotor disk hub (see FIGS. 3 and 4). In sum, several advantages flow from the present invention, including: (1) an increased load capacity (higher speed potential) for a given application and rotor disk material: (2) an increased allowable life cycle for a given rotor disk material; and (3) the ability to use alternate rotor disk materials for a given application.

Although this invention has been shown and described with respect to the detailed embodiments thereof, it will be understood by those skilled in the art that various changes in form and detail thereof may be made without departing from the spirit and the scope of the invention.

I claim:

1. A rotor disk for a gas turbine engine having an axis of rotation and an axial centerline, said rotor disk comprising:

a rim;

a first hub having a first bore centered on the axis of rotation;

a first web having a first interior surface, said first web extending between said rim and said first hub, and wherein said first web intersects a central potion of said first hub such that portions of said first hub extend away from said first web in both axial directions, and said first web is skewed from the axial centerline;

a second hub, having a second bore centered on the axis of rotation, wherein said first and second hubs are spaced apart; and a second web having a second interior surface, said second web extending between said rim and said second hub, and wherein said second web intersects a central portion of said second hub such that portions of said second hub extend away from said second web in both axial directions, and said second web is skewed from the axial centerline;

wherein a circumferentially extending cavity is formed between said web interior surfaces and said hubs.

2. A rotor disk according to claim 1, wherein the each said web is skewed an equal angle from the axial centerline.

3. A rotor disk according to claim 2, further comprising:

means for propelling cooling air radially outward, said means for propelling positioned in said cavity;

wherein said means for propelling, propels cooling air within said cavity radially outward toward said rim.

4. A rotor disk according to claim 3, wherein said means for propelling comprises:

a plurality of vanes extending out from said first and second interior surfaces; and a plurality of cooling air ducts, extending through said rim;

wherein cooling air within said cavity is propelled radially outward, into and through said ducts.

5. A rotor disk according to claim 2, wherein said first and second webs skew away from the axial centerline traveling from said rim to said first and second hubs.

6. A rotor disk according to claim 5, further comprising:

a hub spacer, positioned between said first and second hubs.

7. A rotor disk according to claim 6, wherein said hub spacer is segmented and includes a plurality of cooling air passages to permit the passage of cooling air into said cavity.

8. A rotor disk according to claim 5, wherein a first portion of said rim, said first web and said first hub are forged as a first disk half, and a second portion of said rim, said second web and said second hub are forged as a second disk half, and a metallurgical bond between said first and second rim portions fixes said first disk half to said second disk half.

9. A rotor disk according to claim 8, wherein, said first interior surface includes a first transition surface, at an outer radial end, that curves toward said second interior surface, and said second interior surface includes a second transition surface, at an outer radial end, that curves toward said first interior surface, wherein said transition surfaces meet together and form a smooth transition between said interior surfaces.

10. A rotor disk according to claim 1, wherein said first and second webs skew away from the axial centerline traveling from said rim to said first and second hubs.

11. A rotor according to claim 1, wherein said first hub is substantially symmetrically positioned relative to said first web, and second hub is substantially symmetrically positioned relative to said second web.

* * * * *